United States Patent [19]
Parker

[11] 3,844,572
[45] Oct. 29, 1974

[54] PACKING RINGS
[75] Inventor: Morris J. Parker, Amherst Township, N.Y.
[73] Assignee: Union Carbide Corporation, New York, N.Y.
[22] Filed: Aug. 16, 1972
[21] Appl. No.: 281,159

Related U.S. Application Data
[63] Continuation of Ser. No. 102,225, Dec. 28, 1970, abandoned, which is a continuation of Ser. No. 586,886, Oct. 14, 1966, abandoned.

[52] U.S. Cl..................... 277/27, 277/154, 277/157
[51] Int. Cl............................................. F16j 9/06
[58] Field of Search............. 277/27, 157, 163, 154, 277/199

[56] References Cited
UNITED STATES PATENTS
1,772,698  8/1930  Badeker............................. 277/157
2,731,285  1/1956  Cummings.......................... 277/157
3,235,275  2/1966  Hart................................... 277/154

FOREIGN PATENTS OR APPLICATIONS
4,723      2/1927  Australia............................. 277/157
1,434,699  2/1966  France................................ 277/163

Primary Examiner—Samuel B. Rothberg
Attorney, Agent, or Firm—John C. LeFever

[57] ABSTRACT

A segmented packing ring assembly comprising three identical arcuate segments each having a body and face seal portion rigidly connected thereto, each face seal portion overlapping the body portion of an adjacent arcuate segment and slideably engaging an adjacent face seal portion along a line parallel to a tangent to the ring inner circumference.

3 Claims, 3 Drawing Figures

PATENTED OCT 29 1974
3,844,572
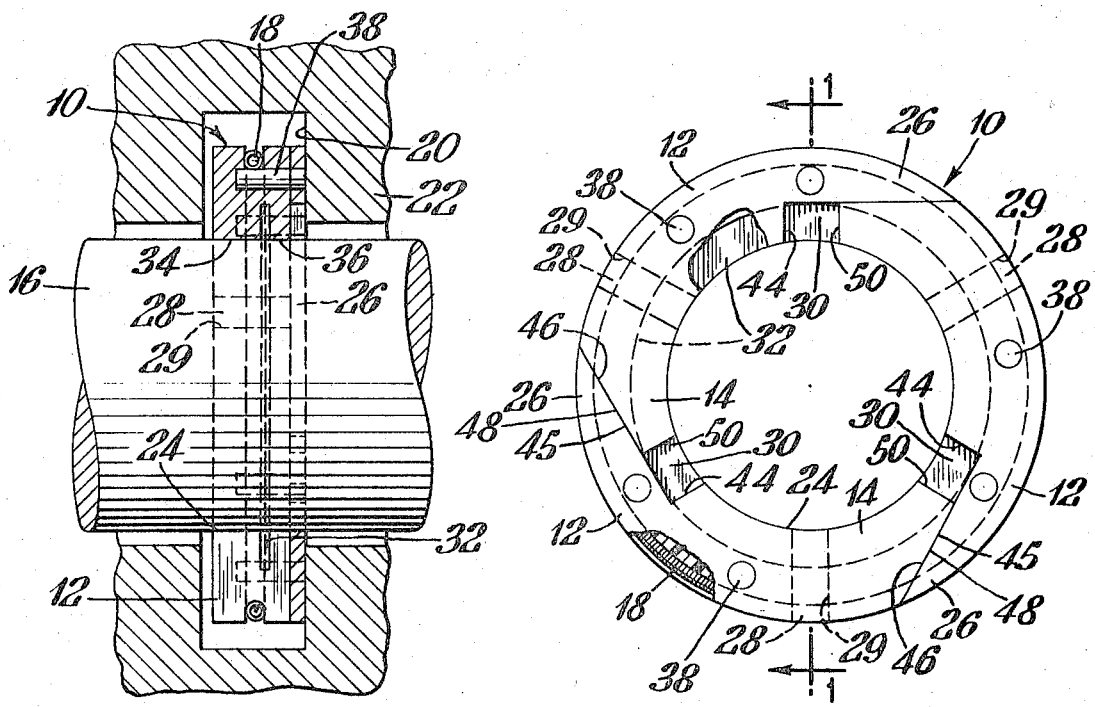
Fig.1.
Fig.2.
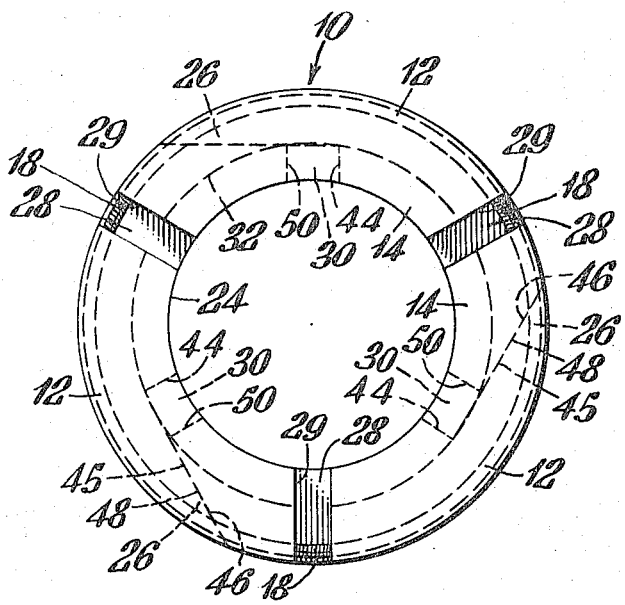
Fig.3.
INVENTOR
MORRIS J. PARKER
BY
Barnwell R. King
ATTORNEY

PACKING RINGS

This application is a continuation of application Ser. No. 102,225, filed Dec. 28, 1970, now abandoned, which in turn is a continuation of application Ser. No. 586,886, filed Oct. 14, 1966, also abandoned.

This invention relates to rod packing seal assemblies for movable rod members, and more particularly to pressure-balanced segmental type packing rings that operate dry and are suitable for oxygen compressors, i.e., where no oxidizable lubricant is permissible.

The invention provides a spring encircled packing ring assembly in which a plurality of relatively thin face seal ring extensions or portions are provided fixed to pressure-balanced body ring portions so as to permit the spring-urged radial inward movement thereof to be controlled by the thicker body ring portions. In a preferred arrangement, the face seal segments are rigidly attached to the body ring portions so as to preserve the axial seal at the outer edge of the face seal portions which slide relative to the adjacent portions to accommodate for ring wear. Thus, the wear rate on the inner circumference of the thin seal ring portions is controlled by such wear on the thick body portions, which are substantially pressure-balanced to reduce the wear of the entire ring assembly.

More particularly, according to the invention, there is provided a packing ring comprising a plurality of arcuate segments having a pressure-balancing arcuate groove on the inner surface thereof, with each of said segments having a body portion and a relatively thin face seal portion, the face seal portion having an extension on one end thereof. Spring means are provided which urge said body portions radially inwardly about a common center. Each of said body portions has a recess in which the adjacent face seal extension fits, thus providing for radial movement inwardly of the segments and face seal extensions under the control of the body portions to maintain effective sealing for the life of the packing ring as it wears in use.

All segments, as well as any connections used between the face seal ring portions or extensions and the load ring portions, preferably are composed of a blended mixture of glass fiber, and lead powder, and polytetrafluoroethylene plastic powders or pellets, molded with heat under pressure.

The invention is ideal for sealing fluid leakage around metal rods or shafts, and particularly around reciprocating piston rods for high pressure oxygen compressors which preferably have piston rods of K-Monel alloy. For nitrogen or air service, stainless steel rods are preferably used in reciprocating compressors. The packing ring segments are retained in position around the rod by a garter spring encircling the ring. The packing ring has exceptionally low wear rate with good effective sealing ability, which is controlled by inward movement of the body portions as the ring wears in use. The packing ring assembly operates dry without any additional lubrication, and also with reduced need for any external cooling.

The invention provides reduced wear and longer life between packing ring replacements as well as reduced wear of the metal piston rods, so that the rods do not become tapered and thus contribute to further strain and wear. Furthermore, safer operation conditions result from the provision of positive wear stops to prevent excessive wear on the ring segments that might otherwise produce objectionable rubbing between the metal garter spring and the rod or shaft, as well as objectionable leakage due to uneven wear in use.

In the drawings:

FIG. 1 is a fragmentary view partly in section and partly in side elevation of a rod packing assembly including a ring illustrative of the invention;

FIG. 2 is a view in front elevation (or lower pressure side) of the ring; and

FIG. 3 is a view in rear elevation (or high pressure side), thereof.

As illustrated by FIG. 1, the packing ring 10 in effect consists of two adjacent sealing rings each having three substantially identical body portions 12, and face seal portions 14, which are retained around rod 16 by a circumferential garter spring 18. As shown, the ring 10 provides a seal around the rod and against the downstream face 20 of a packing case 22 to retain pressurized fluid such as oxygen gas therein.

Details of construction of the ring 10 are further illustrated by FIGS. 2 and 3. The body ring portions 12 are provided with arcuate inner surfaces 24 for sealing engagement with the rod. The thinner face seal portions 14 are attached to the body portions 12 and are provided with projections 26 constituting extensions acting to bridge over gaps 28 between the oppositely facing ends 29 of the body portions 12 and fit into similarly shaped recess 30. This arrangement provides a face seal against surface 20 of packing case 22 to effectively prevent any leakage path or fluid flow through the packing ring.

The body portions 12 have a pressure-balancing groove 32 provided on the inner surface 24 thereof nearer the downstream side of face portions segments 14 than the opposite side of the ring 10. The purpose of pressure-balancing groove 32 is to reduce the radially inward fluid pressure forces on the packing ring portions 12, and thus reduce the bearing forces against the rod 16 at the entire rubbing surface 34, and to confine the principal seal around the rod surface to relatively narrow band 36. Yet almost the entire width of the ring 10 is available as the effective wearing surface against the rod 16.

As stated above, face sealing against face 20 of packing case 22 by the front or downstream side of the ring 10 is provided by relatively narrow sealing ring portions 14, as illustrated by FIG. 2. These portions 14 are preferably made separately and attached to the seal side of the body ring 12 by any suitable means, such as by reinforced polytetrafluoroethylene or metal pins or screws 38. The extensions 26, however, may be made integral with the body ring portions 12.

Thus, when the segments of ring 10 are forced by the surrounding high upstream fluid pressure against the packing case face 20, a seal occurs between the overlapping mating slidable surface portions of ring portions 12 and 14 to prevent fluid passage through the packing ring. Therefore, because one end of the seal ring portions are attached to the body ring portions as described, the position and movement of the seal portions 14 are controlled by the wider body ring portions 12. Thus, the wear rate of the face sealing portion or portions is controlled by the low wear rate of the entire pressure-balanced width of the body ring portions at the inner rubbing surface 24.

As ring wear occurs during operation, the gaps 28 originally provided between body portions 12, as well as the gaps 42 between the ends 44 and 50 of face seal portions 14 and the recesses 30, will close up until the ends of portions 14 touch each other, thus providing positive stops on the amount of allowable ring wear before increased fluid leakage occurs. The adjacent ends of body seal portions 12 preferably act as stops before the face portions do, as they are more positive due to the larger areas involved.

For satisfactory sealing over an extended period, the seal ring portions 14 are preferably rigidly attached to the load ring portions 12, such as by bonding or mechanical fastening at two or more points, such as provided by the screws 38. Also as wear occurs, seals 45 are provided by edge surface 46 of extension 26 sliding along inner adjacent surface 48 of recess 30 in body portions 12. The surfaces 46 and 48 extend in a substantially tangential direction to the arcuate inner surfaces of the body portions, so that seals 45 are preserved as wear progresses. Radial dimension of end 50 at the outer end of projection 26 should exceed the allowable radial wear of the packing ring.

The location and width of the pressure-balancing groove 32 is not critical, but it is preferably located nearer the downstream or face sealing side of the packing ring to provide for reduced radial inward loading forces on the ring segments. This groove width need only be sufficient to permit gas to enter it, such as through the separations or gaps 28 between the load ring portions 12 or through separate grooves (not shown), but will usually be about 1/16 inch wide to permit convenient machining. However, the depth of the groove 32 should exceed the expected radial wear on the inner circumference of the body and face seal ring portions.

For best results, the body ring portions should be dimensioned so that their radial width after normal wear will equal or preferably exceed the total axial width of the portions. This will insure that the upstream fluid pressure will keep the packing ring assembly 10 pressed against the downstream or face sealing side 20 of the packing case 22, and prevent ring axial movement even on the backstroke of the rod.

The packing ring width is preferably dimensioned to fill the packing case snugly with only sufficient axial clearance to provide for ring expansion. However, for wider packing cases, such movement of the packing ring may also be prevented by using a "dummy" or spacer ring within the packing case usually on the upstream or higher pressure side, dimensioned to substantially fill the space.

In addition, the cross-section and/or rigidity of the packing ring should be sufficient so that any radial inward unbalance forces such as across ungrooved portions of the ring are borne by the full width of the ring minus the width of the groove. If the ring is not sufficiently rigid or dimensionally stable, a greater part of the fluid pressure load will be borne by the pressure unbalanced portion and wear will be somewhat greater at those locations. Also, the thickness of the face seal portion and of narrow band 36 must be sufficient to prevent the unsupported area portions from being deformed by the fluid pressure during operating conditions.

As illustrated by FIG. 2, an important feature of this packing ring, particularly for use in non-lubricated hazardous service such as oxygen compressors, is that stops 44 provided in the face seal portions 26 limit the amount of wear which the rings can accommodate before excessive leakage occurs and replacement of the ring set is required. The stop feature is particularly important for oxygen compressor service, because the stops prevent the packing ring wear from inadvertently reaching such an advanced stage that the metal garter spring might rub against the reciprocating rod and cause heat, sparking, and possibly fire.

While these packing rings have been described for reciprocating rod applications, they could also be utilized with suitable modification for sealing rotating shafts by providing suitable stops to prevent rotary motion of the ring. While the preferred material is the glass and lead-filled polytetrafluoroethylene as described above, any suitable material may be used depending upon the service to which the ring is subjected.

What is claimed is:

1. A segmented packing ring comprising the combination of three identical arcuate segments arranged and positioned to form inner and outer circumferences with top and bottom surfaces in a common plane, each arcuate segment having a body portion and a face seal portion rigidly connected thereto; each face seal portion being arranged to extend beyond one end of the body portion to which it is connected and to overlap one end of the body portion of an adjacent arcuate segment; each of said face seal portions being arranged to slideably engage a face seal portion of an adjacent arcuate segment as contiguous surfaces along a line parallel to a tangent to the inner circumference of said packing ring with the face seal contiguous surfaces along said line of slideable engagement being substantially perpendicular to the plane of said packing ring with an end gap at said inner circumference extending only part of the ring width towards said outer circumference; the adjacent end of said body portions being spaced from each other by gaps and arranged to extend beyond one end of said face seal portion, each arcuate segment inner arcuate surface having a pressure balancing groove therein substantially in the plane of said packing ring; and spring means provided on each arcuate segment for urging the three arcuate segments radially inward toward a common center.

2. A segmented packing ring as described in claim 1 wherein the face seal portion of each arcuate segment is thinner than the body portion of such segment.

3. A segmented packing as described in claim 1 wherein the adjacent ends of said body portions are substantially radial and perpendicular to the plane of the packing ring.

* * * * *